United States Patent [19]

Atwater

[11] 4,115,860
[45] Sep. 19, 1978

[54] PLURAL LOAD POWER CONTROLLER WITH TIME-SHARED PROCESSOR

[75] Inventor: Jerrold Bradford Atwater, North Plainfield, N.J.

[73] Assignee: Lockheed Electronics Co., Inc., Plainfield, N.J.

[21] Appl. No.: 802,965

[22] Filed: Jun. 2, 1977

[51] Int. Cl.$^2$ .................... H02J 1/00; G06F 15/20
[52] U.S. Cl. ......................... 364/492; 307/31
[58] Field of Search ............ 235/151.3, 151.31, 151.21, 235/150.3; 307/43, 52, 31, 35, 38, 39

[56] References Cited

U.S. PATENT DOCUMENTS

| | | | |
|---|---|---|---|
| 3,652,838 | 3/1972 | Dillon et al. | 235/151.21 X |
| 3,697,768 | 10/1972 | Johnston | 235/151.21 X |
| 3,842,249 | 10/1974 | Geyer et al. | 235/151.21 |
| 3,982,109 | 9/1976 | Klinck et al. | 235/150.3 |
| 4,034,233 | 7/1977 | Leyde | 235/151.21 X |

Primary Examiner—Edward J. Wise

[57] ABSTRACT

A power controller arrangement employs a digital processor to monitor and control plural loads, e.g., to monitor and maintain at prescribed levels the temperatures of plural missiles. During each load data processing cycle of operation, the processor presets a down-counter which governs load (e.g., missile heater) energizing power by duty factor modulation. The value preset into the counter is dependent upon any measured temperature error, and the then obtaining load power level.

In accordance with one aspect of the present invention, the modulation governing counter is periodically decrimented to progressively reduce power delivered to a load absent sufficiently frequent processor updating of the load-associated regulating circuitry. This provides fail-safe load passivation upon processor failure or overload.

9 Claims, 4 Drawing Figures

PLURAL LOAD POWER CONTROLLER WITH TIME-SHARED PROCESSOR

DISCLOSURE OF INVENTION

This invention relates to electronic automated load control and, more specifically, to improved, fail-safe power regulating apparatus useable, for example, to maintain constant the temperature of a nuclear warhead armed missile.

It is an object of the present invention to provide improved electronic load controlling apparatus.

More specifically, it is an object of the present invention to provide digital processor controlled, multiplexed power regulating apparatus which monitors and controls a parameter (e.g., temperature, pressure and/or the like) on plural load elements; and which automatically, monotonically progresses to a load deenergized state upon processor failure, prolonged overload with higher priority tasks, or other debilitating condition.

These and other objects of the present invention are realized in a specific illustrative power controller arrangement employing a digital processor to monitor and control plural loads, e.g., to monitor and maintain at prescribed levels the temperatures of plural missiles. During each load data processing cycle of operation, the processor presets a downcounter which governs load (e.g., missile heater) power, as by duty factor (pulse width or pulse rate modulation). The value preset into the counter is dependent upon any measured temperature error, and the then obtaining load power level.

In accordance with one aspect of the present invention, the modulation specifying counter is periodically decrimented to progressively reduce load-energizing power absent sufficiently frequent processor updating of the load-associated regulating circuitry.

The above and other features and advantages of the present invention will become more clear from the following detailed description of a specific, illustrative embodiment thereof, presented hereinbelow in conjunction with the accompanying drawing, in which:

FIGS. 2A and 2B are timing diagrams illustrating operation of the FIG. 1 circuitry, FIG. 2A depicting the voltage present at the output of a gate 35 in FIG. 1, while FIG. 2B depicts a waveform obtaining at the output of AND gate 39 of FIG. 1;

Figure 1:
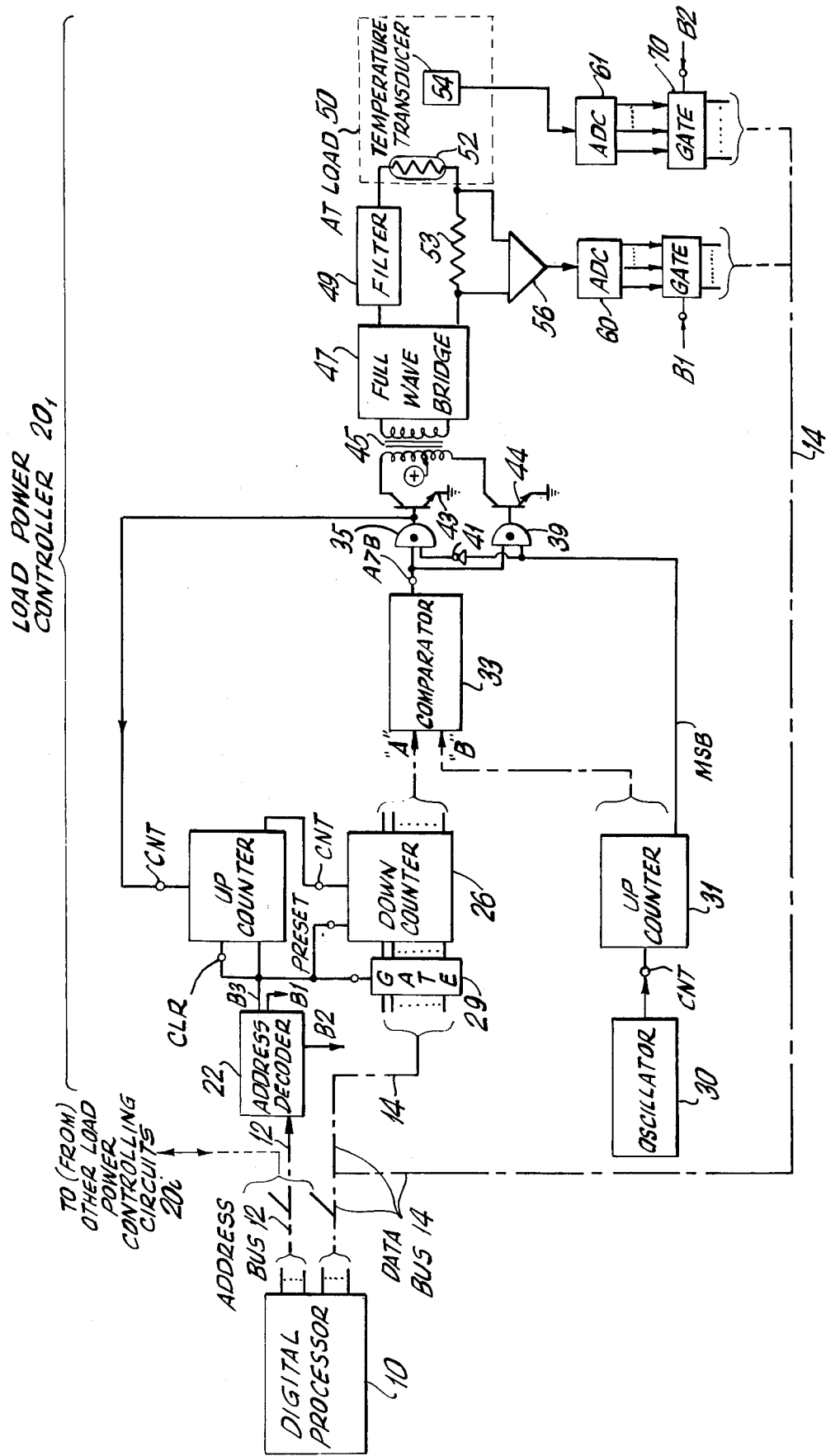
FIG. 1 is a schematic block diagram illustrating power controlling apparatus illustrating the principles of the present invention.

Referring now to FIG. 1, there is shown apparatus for controlling power delivered to, and thereby the condition of an array of controlled loads, e.g., for controlling the power delivered to each heater 52 of an array of such devices each employed for controlling the temperature of a different one of a missile array. The apparatus includes a digital processor 10 of any known form, e.g., a general purpose computer, minicomputer, or microprocessor with the memory and interface performance conventionally associated therewith. The digital processor 10 is connected to electronics associated with each of the controlled loads via a plural conductor address bus 12 and data bus 14. The circuitry $20_1$ associated with one load is shown in detail in FIG. 1, additional such circuits $20_i$ being employed for each of the other system loads.

By way of overview, it will be assumed that the apparatus shown in the drawing is to be employed to maintain constant the temperatures obtaining at the plural loads (assumed, missiles) employing a heater 52 at or in each load, and a temperature sensing transducer 54 on the load (missile) to report the instantaneous temperature thereof. The apparatus of the instant invention delivers to each heater 52 that amount of power required to bring the associated load up to a specified, desired temperature, and to maintain the temperature at the prescribed value, as reported by the temperature transducer 54. The power delivered to the heater 52 is varied, upwards or downwards as appropriate, should any correction in temperature be required. The circuitry associated with each of the different loads performs in a manner identically paralleling the apparatus $20_1$ shown in FIG. 1, and thus only controller circuitry $20_1$ is shown and described in detail.

In accordance with one aspect of the instant load controlling application and apparatus, it is desired that each circuitry 20 operate in a fail-safe mode, i.e., monotonically decrease load exciting power and thus temperature if the processor 10 fails, is overloaded, or otherwise fails to poll and update the apparatus 20 associated with any load within a prescribed amount of time. Obviously in a nuclear warhead controlling apparatus system, (among others), warhead system shutdown is desired in such circumstances.

The apparatus 20 shown in the drawing, in common with all other such circuits, basically controls the power delivered to heater 52, as by duty factor (e.g., pulse width) modulation, i.e., to operate at a fixed cyclic rate corresponding to the output of an oscillator 30, and to vary the interval during each cycle during which the heater 52 is energized. To this end, the digital processor 10 loads a power regulating binary word into a down counter 26 via data bus 14 and gate 29. Concurrently therewith, the processor 10 impresses a unique address for counter 26 of the circuit $20_1$ on the address bus 12. This is decoded in address decoder 22 of any conventional form (e.g., a simple AND gate with selective inverting inputs) which generates an active "B3" output. The "B3" signal at such time activates gate 29 and also the preset input of counter 26 to thus parallel-load data from bus 14 into the counter 26.

Figure 2A:
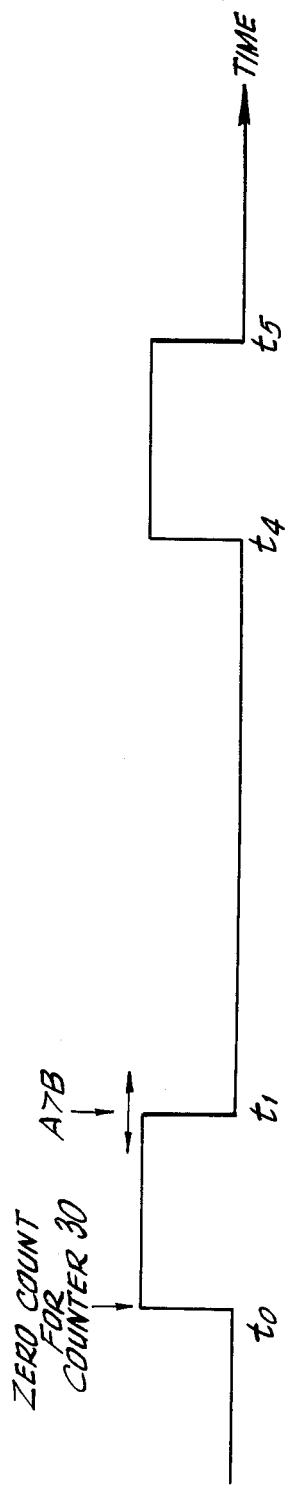

Assume with respect to FIGS. 1 and 2A (FIG. 2A representing the voltage waveform at the output of an AND gate 35 in FIG. 1), that at a time to an up-counter 31 cycled by oscillator 30 has just passed through its cleared or zero state. The outputs of the counters 26 and 31 are respectively supplied as the "A" and "B" inputs to a plural bit digital comparator 33. Following such time, $t_o$, the stage outputs of downcounter 26 (which substantially serves as a register since the count (CNT) input thereof is not normally excited) exceed the contents of the counter 31 such that the "A greater than B" output of comparator 33, and the connected input of AND gate 35, is enabled. The other input of AND gate 35 is similarly enabled by the initial "0" most significant digit output of counter 31 which is inverted at inverter 41. Thus, following the cleared condition of the counter 31, at time $t_o$, the AND gate 35 is fully enabled and turns on transistor 43, thus delivering power to the heater 52 via transformer 45, full wave bridge 47, and a ripple filter 49. This energized state is shown following the time $t_o$ in FIG. 2A.

This excited state for the gate 35, transistor 43 and heater 52 obtains following the time $t_o$, as shown in FIG.

2A, until the count of counter 31 progresses to the point where its output exceeds the value stored in the down-counter 26 by processor 10. Following this period, the "A greater than B" output of comparator 33 is disabled, thereby turning off AND gate 35, transistor 43 and heater 52. This off condition for the AND gate 35 and transistor 43 persists until the counter 31 completely cycles back to its cleared state (time $t_4$ in FIG. 2A) to begin the next cycle of operation.

It will be appreciated that the time $t_0$–$t_4$ is fixed, and depends solely on the output frequency of oscillator 30. On the other hand, the "on" or active periods for gate 35 and transistor 43, corresponding to the time intervals $t_0$–$t_1$, $t_4$–$t_5$, ..., depend upon the contents of counter 26; the higher the stored contents in counter 26, the larger the on time and the greater the energy delivered to the heater 52. Thus, heater 52 power is modulated on a pulse width basis, controlled by the contents of counter 26.

The AND gate 39 and the transistor 44 operate in a manner directly analagous to gate 35 and the transistor 43 to also deliver pulse width modulated energy to the heater 52 during alternate half cycle periods. In essence, the most significant output bit of the counter 31 divides one counter 31 full incrementing period in half, operatively selecting the gate 35 when the most significant bit is zero by reason of inverter 41 and selecting the AND gate 39 and transistor 44 when the most significant bit is a "1", i.e., for counter states 100 . . . 0 through 111 . . . 1. Accordingly, the above discussion has shown that the amount of energy delivered to heater 52 for controlling the temperature of the missile or any other load powering purpose is controlled by the digital processor 10, depending upon the value of the digital word entered into the counter 26.

The above discussion has assumed pulse width modulation to generate a contents of counter 26 — dependent control signal to gate or switch power to the load 52. Other forms of modulation may be employed as well, as will be readily apparent to those skilled in the art. Thus, for example, pulse rate modulation may be utilized, employing the output of down-counter 26 to control a rate multiplier driven by the oscillator 30 which supplies pulses of fixed width, or to control any other form of variable frequency controlled oscillator followed by a fixed pulse width generating monostable trigger circuit.

As above discussed, it is desired that the load controlling apparatus operate in a fail-safe mode, i.e., to progressively reduce energy delivered to the heater 52 unless the apparatus 20 is polled and updated by the processor 10 within a prescribed maximum time interval. To this end, the output of gate 35 is supplied as an input to the count (CNT) input port of an upcounter 24, the most significant output stage of which is supplied as an input to the count (CNT) input of the downcounter 26. The clear (CLR) input to counter 24, which clears the counter to an all zero state, comprises an output (e.g., "B3") of the address decoder 22, and is thus excited whenever digital processor 10 supplies a downcounter 26 loading address command to the particular apparatus $20_1$ shown in the drawing. Once each full operative cycle above discussed (e.g., at the times $t_0$, $t_4$, ..., shown in FIG. 2A) the up-counter 24 increments one state in a binary sequence assuming a binary counter 24. The system is scaled such that the particular apparatus 20 shown in FIG. 1 should be repolled, i.e., readdressed, by the processor 10 in a time period before a "1" will register in a most significant stage of the counter 24, i.e., assuming an n-stage counter 24 before $2^{n-1}$ pulses are received from the output of AND gate 35. As long as the apparatus 20 is addressed at least that frequently, the counter 24 will be repetitively cleared by address decoder 22 before any output pulses can be supplied from the most significant stage of the counter 24 to the count (CNT) input of down-counter 26.

Figure 2B:
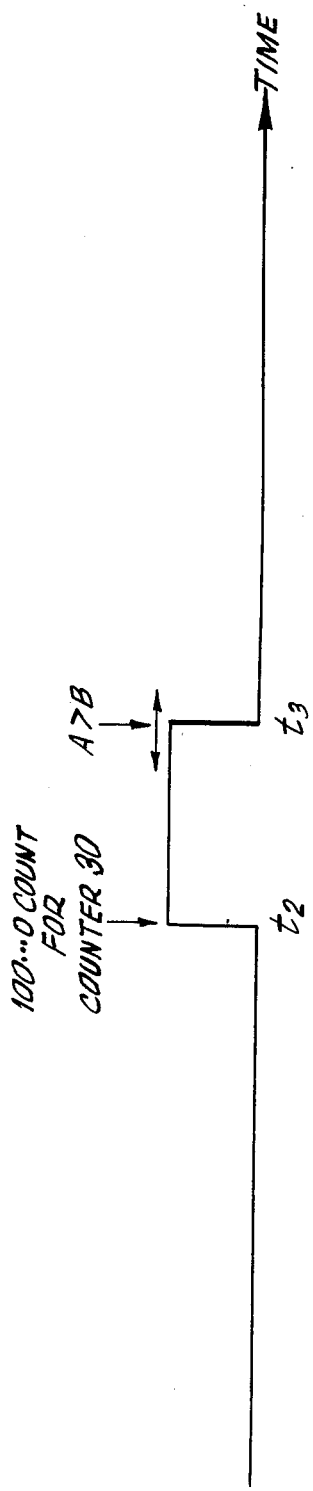

Assume, however, that for some reason the apparatus $20_1$ shown in detail is not polled for a relatively prolonged period of time, e.g., due to some processor 10 failure or overload. Should such a condition obtain, each $2^n$ pulses supplied to the count (CNT) input of counter 24 furnish an output pulse to the count (CNT) input of the down-counter 26 which therefore decrements by one the contents previously stored therein. This monotonically decreasing contents of counter 26 progressively decreases the active period for power delivered to the load 52 (i.e., the times $t_1$, $t_3$, $t_5$, ..., closer to the times $t_0$, $t_2$, $t_4$, ..., in FIG. 2. If such operation continues for a considerable period of time, the load 52 will become totally deenergized — the desired state for the insufficiently controlled situation. Thus, the desired fail-safe automatic shutdown condition is satisfied. It is observed, of course, that the input to the count port of counter 24 may come from any number of places beside the output of AND gate 35, e.g., from gate 39, counter 31, oscillator 30, or an independent timing source. The principle matter is simply that the size of counter 24 be sufficient in relation to the frequency of the input pulses such that it supplies an output pulse to decrement counter 26 unless cleared by address decoder 22 within the desired time and, conversely, supply no such pulse if so cleared.

Attention is directed now to the operation of digital processor 10 in collecting the necessary monitoring information for conditions obtaining at each of the controlled loads, and for generating the digital control word to be stored in the down-counter 26 associated with each control circuit $20_i$, e.g., the typical such circuit $20_1$ shown in detail in the drawing. By way of monitoring information, temperature transducer 54 supplies its output to an analog-to-digital converter 61 having its outputs coupled to a gate 70. The processor 10 interrogates the temperature at the particular load shown by supplying the unique polling address for the gate 70 of circuit $20_1$ on address bus 12. This address is decoded by address decoder 22 (active "B2" output) to enable gate 70 thereby coupling the output of the analog-to-digital converter 61 (and only element 61) to the processor 10 via data bus 14.

It is also desirable to know the amount of energy then being delivered to the load actuating element (i.e., the heater 52). Since the heater 52 is substantially a constant impedence device, load power is measured by the current flow through a small current monitoring resistor 53 connected in series with the heater 52. The voltage across monitor resistor 53 is sensed, as by a difference amplifier 56, converted to digital form by analog-to-digital converter 60 and selectively communicated to the processor 10 by a gate 63 and the system data bus 14 when the processor 10 issues a suitable address on bus 12. The analog-to-digital converters 60 and 61 may obviously be combined, with multiplexing apparatus being employed to select between the outputs of elements 54 and 56 using the "B2" and/or "B3" signal for input selection. In such a manner, the digital processor 10 thus has stored therein information relating to the temperature of each load, and the instantaneous power being delivered to each load.

To illustrate the data processing effected by the digital processor 10, assume the following processor variable definitions:

TMEAS(I) = the temperature of the i-th load (missile) as reported by the corresponding temperature transducer 54 of circuit $20_i$. Throughout data processing, it will be assumed that (I) is a running variable to identify the several controlled loads, and a variable in the form "TMEAS(I)" is a one dimensional plural storage address scaler having an index "I" as is conventional notation in data processing.

TDES(I) = The desired temperature for the i-th load (missile).

PNEW(I) = the computed new power to be delivered to the heater 53 for the i-th load, and corresponds to the word to be stored into counter 26 of circuit $20_i$ by the processor 10.

With the above definitions in mind, illustrative, schematic coding for operation of the processor 10 will now be described. Statements are presented in the form of a schematic, non-literal FØRTRAN type language. However, it will be appreciated by those skilled in the art that any program language may be used, and differing particular sequences of operations, without departing from the instant invention.

A first instruction, DØ I = 1,N     (1)

initializes an iterative, so called "DØ loop", i.e., simply initializes the running index I to one for the first execution of the instruction sequence. The following instruction

TER = TDES(I)-TMEAS(I)     (2)

computes the value of any temperature error (TER) between the temperature desired for the i-th missile [TDES(I)] and the temperature actually measured at the missile [TMEAS(I)] by subtracting these two quantities. The statement

PACT = (IMEAS(I)**2)*K1     (3)

determines the value of the power measured as actually being delivered to the heater 52 under consideration by squaring the current flowing through that heater, as sensed in the monitored resistor 53 [IMEAS(1)2], with "2" denoting exponentiation, and multiplying the squared value by a constant K1 to account for heater resistance and any system scaling factors. This is done, of course, since power through a resistive element is proportional to the square of the current flowing therethrough. Instruction (4),

IF (TER*K2-PACK), A, X, B     (4)

comprises a conditional branching instruction to transfer program control to the instructions stored at an address "A", "X", or "B", respectively, depending upon whether or not the arithmetic statement in the parentheses is positive, zero or negative. More particularly, system control will be transferred to address "A" [instruction (5)] if additional power must be supplied to the heater to overcome any obtaining temperature error, to an address "X" [storing instruction (8)] if the proper amount of power is being delivered to the heater; and to an address "B" [instruction (7)] if excess power is being delivered to the heater. The expression "TER*K2" determines what an appropriate power would be to correct the measured temperature error (stored in memory cell TER) as derived from the computational results of statement (2)) by multiplying the temperature error by a temperature error-to-power correcting multiplier factor K2 (a table look-up could alternatively be employed). Thus the total operative arithmetic statement "TER*K2-PACT" represents the difference between what is needed and what is being supplied; is positive or negative if insufficient or excess power is being supplied; and is zero if just the right amount of power is currently being delivered to the heater 52.

Assuming the case of insufficient power being delivered to the heater 52, branching instruction (4) transfers control to instruction (5), (A) PNEW(I) = PNEW(I)+2     (5)

which increments the previous value of power delivered to the load (i.e., the number to be stored in counter 26) by a fixed increment (e.g., "2"). Instruction (6)

GØTØ X     (6)

(B) PNEW(I) = PNEW(I)-2     (7)

X ØUTPUT PNEW(I)     (8)

CØNTINUE     (9)

transfers control to instruction (8) which simply outputs the new, updated value for the power controlling variable PNEW(I) for the i-th load into the counter 26 of circuit $20_i$. The computational loop then transfers control back for the next iteration for instruction (2) through (8), incrementing the index I by one for next load processing after each iteration until completed.

Figure 3:
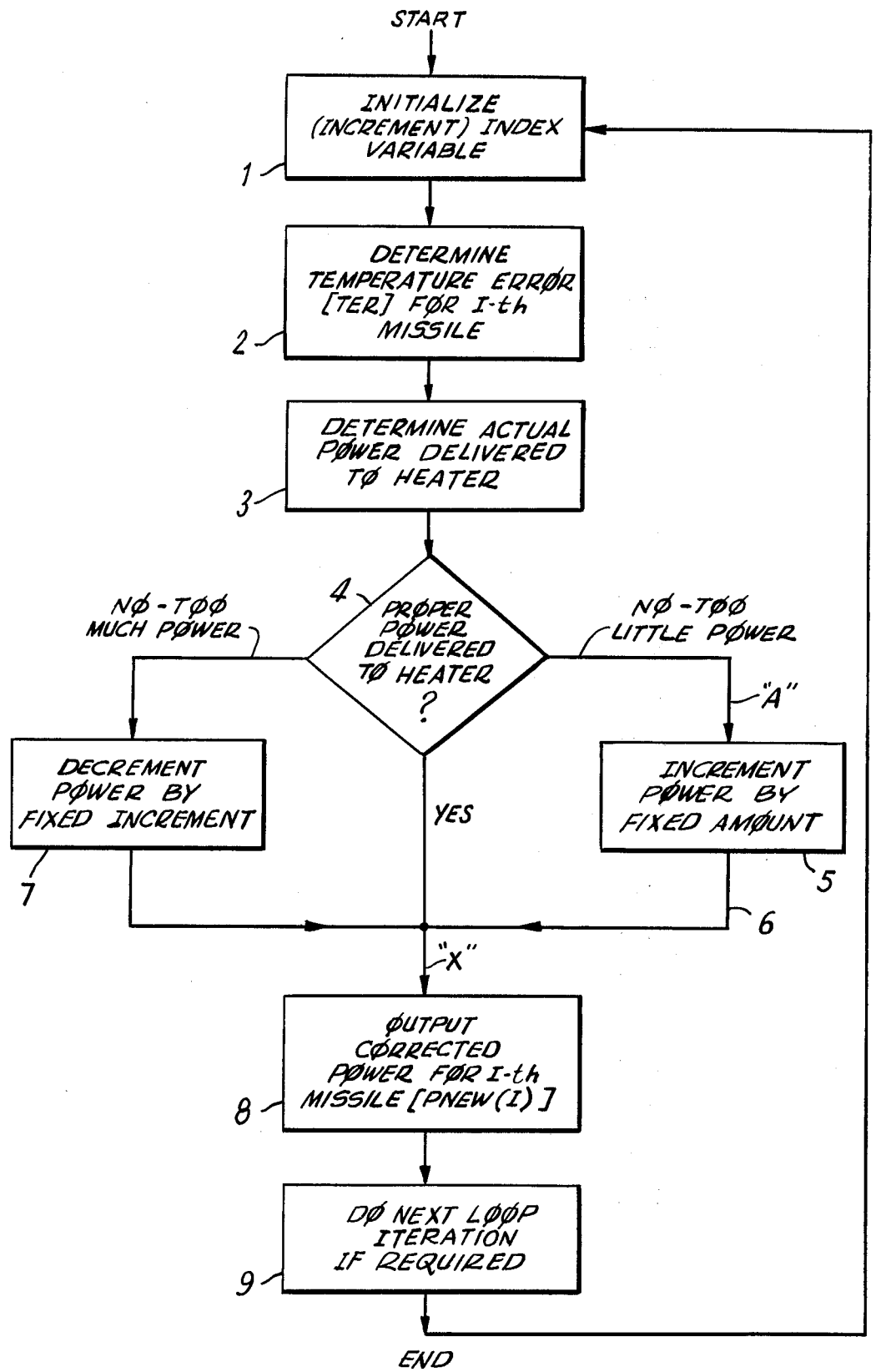
FIG. 3 is a flow chart illustrating the portion of the composite FIG. 1 power controlling apparatus.

If excess power is being supplied to the load, branching instruction (4) transfers the computer instruction location counter to instruction (7) which decrements the previously obtaining power controlling variable [PNEW(I)] by two, and instruction (8) outputs the revised value, thereby storing the lowered number in the proper counter 26. Finally, if the power value was already proper, branching instruction (4) directly transfers control to instruction (8) to restore the unrevised, previously obtaining value of PNEW(I) in the counter 26. The foregoing mode of data processing is also set forth in flow chart form in FIG. 3. In FIG. 3, the parenthetical numerals in the functional blocks correspond to the instruction numbers set forth hereinabove.

Accordingly, the arrangement shown in FIG. 1 operates in the manner above discussed to control any load parameter(s) at each of plural associated loads by effecting the requisite excitation of a control element thereat.

The above described arrangement is merely illustrative of the principles of the present invention. Numerous modifications and adaptations thereof will be readily apparent to those skilled in the art without departing from the spirit and scope of the present invention.

What is claimed is:

1. In combination in regulator apparatus, plural loads, digital processor means, and plural load regulator means each connected between said processor means and a different one of said loads, each of said plural load regulator means including binary wind registering means, means for loading said word registering means with an output from said digital processor means, variable duty factor means connected to and responsive to said binary word registering means for supplying an output control wave of varying duty factor, and gated load energizing means having a gate control port connected to the output of said variable duty factor means.

2. A combination as in claim 1, wherein said variable duty factor means comprises pulse width modulation means including a counter, an oscillator for cycling said counter, comparator means having inputs connected to the outputs of said binary word registering means and said counter.

3. A combination as in claim 1 wherein said binary word registration means comprises a counter, resetable cyclic timing means for selectively energizing said counter, and means responsive to outputs from said digital processor means for resetting said resetable cyclic timing means.

4. A combination as in claim 3 wherein said resetable cyclic timing means comprises an additional counter having an output connected to an input of said counter.

5. A combination as in claim 4, wherein said variable duty factor means comprises pulse width modulation means including a further counter, an oscillator for cycling said counter, comparator means having inputs connected to the outputs of said binary word registering means and said further counter.

6. A combination as in claim 5, wherein said gated load energizing means comprises a cascaded gated bipolar switch, a transformer, and a ripple filter.

7. A combination as in claim 1 wherein each of said plural load regulator means includes load power sensing means, load condition sensing transducer means, and means selectively coupling each of said load power sensing means and said load condition sensing means of each of said plural load regulator means to said digital processor means.

8. A combination as in claim 7 further comprising plural heaters each connected to said gated load energizing means of a different one of said load regulator means.

9. A combination as in claim 7 wherein said digital processor means comprises iteratively operable means including means for computing any condition error, means for computing load power required to obviate the error determined by said condition error computing means, and means for selectively storing a revised binary word in said binary word registering means responsive to a comparison between load power sensed by said load power sensing means and said error obviating power determined by said load power computing means.

* * * * *